(12) United States Patent
Müller

(10) Patent No.: US 8,528,992 B2
(45) Date of Patent: Sep. 10, 2013

(54) CONNECTING DEVICE AND RUBBER LINK TRACK

(75) Inventor: Winfried Müller, Remscheid (DE)

(73) Assignee: Diehl Defence Land Systems GmbH, Freisen (DE)

( * ) Notice: Subject to any disclaimer, the term of this patent is extended or adjusted under 35 U.S.C. 154(b) by 0 days.

(21) Appl. No.: 13/295,271

(22) Filed: Nov. 14, 2011

(65) Prior Publication Data

US 2012/0112526 A1 May 10, 2012

Related U.S. Application Data

(63) Continuation of application No. PCT/EP2010/002773, filed on May 6, 2010.

(30) Foreign Application Priority Data

May 12, 2009 (DE) .......................... 10 2009 020 906

(51) Int. Cl.
*B62D 55/215* (2006.01)

(52) U.S. Cl.
USPC .............................. 305/158; 305/165; 305/42

(58) Field of Classification Search
USPC ................. 305/157, 158, 159, 163, 164, 165, 305/42, 43
See application file for complete search history.

(56) References Cited

U.S. PATENT DOCUMENTS

| 1,956,472 | A | | 4/1934 | Penn | |
|---|---|---|---|---|---|
| 2,350,444 | A | | 6/1944 | Burgess | |
| 2,391,907 | A | * | 1/1946 | Knox | 305/42 |
| 2,402,042 | A | * | 6/1946 | Haushalter | 305/158 |
| 2,687,923 | A | * | 8/1954 | Proske | 305/164 |
| RE23,954 | E | * | 2/1955 | Proske | 305/163 |
| 2,719,759 | A | * | 10/1955 | Waller | 305/164 |
| RE24,331 | E | * | 6/1957 | Proske | 305/163 |
| 4,195,887 | A | * | 4/1980 | Ruddell | 305/42 |
| 4,262,972 | A | * | 4/1981 | Falk | 305/163 |

(Continued)

FOREIGN PATENT DOCUMENTS

| CN | 1802284 | A | | 7/2006 |
|---|---|---|---|---|
| DE | 3437484 | A1 | | 4/1986 |
| DE | 4407268 | A1 | | 9/1994 |
| EP | 0319367 | A1 | | 6/1989 |
| GB | 2039836 | A | * | 8/1980 |

OTHER PUBLICATIONS

International Search Report dated Aug. 10, 2010.

*Primary Examiner* — Kip T Kotter

(74) *Attorney, Agent, or Firm* — Laurence A. Greenberg; Werner H. Stemer; Ralph E. Locher

(57) ABSTRACT

A device for connecting two free ends of a rubber band track to one another or for connecting the ends of several band segments to one another. The device has two or more tubes and a pin rubber-mounted in the respective tube. The tubes are in each case inserted into the one end and into the other end of the rubber band track or of the band segments, and at least one connector, by way of which the pins are coupled together in a rotationally fixed manner. The rotational rigidity of the pins in relation to their respective tube, brought about by the rubber mounting, is adjusted in dependence on the flexural strength of the rubber band track or of the band segments in the region of the ends.

17 Claims, 6 Drawing Sheets

(56) References Cited

U.S. PATENT DOCUMENTS

| | | | |
|---|---|---|---|
| 4,572,588 A * | 2/1986 | Wiesner et al. | 305/204 |
| 4,735,465 A * | 4/1988 | Wiesner et al. | 305/203 |
| 4,892,365 A * | 1/1990 | Szakacs | 305/59 |
| 5,058,963 A * | 10/1991 | Wiesner et al. | 305/158 |
| 7,396,091 B2 * | 7/2008 | Welp et al. | 305/158 |
| 2002/0079737 A1 | 6/2002 | Doyle | |

\* cited by examiner

US 8,528,992 B2

CONNECTING DEVICE AND RUBBER LINK TRACK

CROSS-REFERENCE TO RELATED APPLICATION

This is a continuation application, under 35 U.S.C. §120, of copending international application No. PCT/EP2010/002773, filed May 6, 2010, which designated the United States; this application also claims the priority, under 35 U.S.C. §119, of German patent application No. DE 10 2009 020 906.9, filed May 12, 2009; the prior applications are herewith incorporated by reference in their entirety.

BACKGROUND OF THE INVENTION

Field of the Invention

The invention relates to a device for connecting one end of a rubber band track to another end of the rubber band track or for connecting one end of a first band segment of a rubber band track to another end of a second band segment of a rubber band track.

Vehicle tracks have always been used for mobilizing vehicles where, on account of heavy vehicle weight and/or the use of the vehicle in rough terrain, the use of wheels for propelling the vehicle would be problematic. The use of a vehicle track involves said vehicle track being exposed to a torsional force at regular intervals when circulating in the so-called running gear. Such typical load situations are, for example in the case of a tank, the return points on the drive gear and the return roller. In the case of a vehicle track with track links made of steel, the torsional capability of the track can only be ensured by segmenting (=dividing into track links) and installing pins and pin supports. However, the technology of a pure steel track, as was still used during the Second World War, quickly reaches its limits. Thus, for a higher vehicle speed it is necessary for the vehicle track to have certain elasticity. In addition, the service life of a pure steel track is greatly limited by the constant metal/metal contact between the track links or pin supports and the pins. Consequently, in the past rubber-mounted pins have been used more and more in the production of vehicle tracks. Said rubber-mounted pins are pressed, prestressed, into bores in the track links in such a manner that when the track rotates in the running gear, there is neither friction between the steel faces nor friction between the rubber surfaces and the steel faces. The rotating of the pins in the bores of the track links (=pin supports) is absorbed completely by the elastic deformation of the rubber layer, which is pressed in between the surface of the pin and the bore in the track link.

In the more recent past, the great advances in material research have meant that the use of rubber band tracks has become more and more interesting, not only in the military sector but also as regards civilian vehicles such as, for example, snow removal vehicles. In contrast to a steel track, a rubber band track, in principle, does not need any pin bearings at all. The ability of the rubber band or the tension supports located therein to stretch (steel cables or composite fibers) ensures both the elasticity in the longitudinal direction and the necessary torsional capability when guiding the rubber band track. However, the handling (fitting and removing) of such a closed, indivisible track is difficult and expensive. Consequently, it would be desirable to combine the principal advantages of a rubber band track with the advantage of easy assembly or disassembly of the track on the vehicle.

However, transferring the principle of the rubber-mounted pins from the pure steel track to the rubber band track proves to be problematic as the body of the rubber band track, in contrast with the track link of a steel track, is itself elastic and consequently deformable.

The present invention proceeds from the idea of applying the concept of the so-called steel connector track to a rubber band track. As shown in FIG. 1A in top view and in FIG. 1B in side view, in the case of the steel connector track adjacent track links 1', 1" are connected to each other by so-called connectors 10. Each track link 1', 1" of a steel connector track includes two link pins 20, 21, which are connected to the track link body 1', 1" by a link pin mounting 18 containing rubber. Therefore, each track link 1', 1",—in contrast to the so-called hinge track—has two axes of rotation Z. The connectors 10 and the link pins 20, 21 connected thereby of two adjacent track links 1', 1" form a rigid bond on account of the interlocking and/or frictional locking between the connectors 10 and the link pins 20, 21. A track pitch t* can be composed of the size of the track link body $t^*_K$ and the size of the connector $t^*_V$.

The detailed view in FIG. 2 shows clearly the situation when the steel connector track is pivoted out of the position in which the link pin mounting 18 is not exposed to torsional stress in order, for example, to be adapted to the reference circle of the drive wheel. The track link body 1' is then rotated about the link pin 20, as a result of which the link pin mounting $18_{DEF}$ is deformed. This deforming is made clear by means of the oblique hatching of the left-hand link pin mounting $18_{DEF}$. The rotating of the track link body 1', 1" about its respective link pin 20, 21 is absorbed completely by the link pin mounting 18 such that no displacement occurs between the surface of the pin and the inside wall of the link pin mounting 18 and also no displacement occurs between the outside wall of the link pin mounting 18 and the inside wall of the track link bore.

If we now want to apply the above-described principle of the steel connector track to a rubber band track, we have the problem that in the case of a rubber band track not only the link pin mounting 18 but also the rubber band link body would itself be elastic and consequently deformable. The set of problems arising from this is illustrated in FIG. 3. If a torque M (indicated in the schematic diagram in FIG. 3 as a lever which co-operates with the axis of rotation Z of the pin 20 and is rotated about the angle β) acts between track base body 2 and pin 20, this results in forces being transferred via the rubber mounting 18 onto the rubber base body 2 and compressing and/or stretching said rubber base body 2, in particular in its end region 101, 102; 101', 102'. In particular, the region between the pin 20 and any cross members 50, 51 inserted into the rubber base body 2 for structural reinforcement is under particular tensile and/or stretching load. At points that are loaded in this manner 101, 102; 101', 102', this can result in high stresses in the rubber bearing surface which can lead to tearing in the rubber bearing surface. Once there is tearing in the track base body 2 at the relevant points, said tearing can very quickly progress in the base body 2, which can ultimately result in the pin support part being torn off from the remaining part of the base body 2. Thus, the advantage of freedom from wear between pin 20 and pin mounting, achievable in principle by means of the rubber mounting 18, is cancelled out again by the disadvantage of the fatigue tearing in the track base body 2 in the region of the ends 101, 102; 101', 102' of the rubber band track.

SUMMARY OF THE INVENTION

It is accordingly an object of the invention to provide a connector for a rubber track and a rubber track which overcome the above-mentioned disadvantages of the heretofore-known devices and methods of this general type and which provides for a transfer of the primary concepts of the so-called steel connector track to a rubber band track.

With the foregoing and other objects in view there is provided, in accordance with the invention, a device for connecting first and second free ends of a rubber link track to one another or for connecting first and second free ends of first and second band segments, respectively, of a rubber band track to one another, the device comprising:

at least two tubes each having a pin rubber-mounted therein, wherein one of said tubes is to be inserted into the first end of the rubber band track or of a band segment and another one of said tubes is to be inserted into the second end of the rubber band track or of a band segment; and at least one connector configured to couple said pins together in a rotationally fixed manner;

wherein a rotational rigidity of said pins relative to a respectively associated said tube, brought about by the rubber mounting, is adjusted in dependence on a flexural strength of the rubber band track or of the band segments in a region of the ends.

In other words, in consideration of the set of problems depicted beforehand, the present invention proposes a device for connecting one end of a rubber band track to another end of the rubber band track or for connecting one end of a first band segment of a rubber band track to another end of a second band segment of a rubber band track. Said device as claimed in the invention comprises at least two tubes having a pin which is rubber-mounted in the respective tube, it being possible for one of said pins in each case to be inserted into the one end and into the other end of the rubber band track or of the band segments, and at least one connector, by means of which the pins are couplable together in a rotationally fixed manner. In this case, the rotational rigidity of the pins in relation to their respective tube, brought about by the rubber mounting, is adjusted in dependence on the flexural strength of the rubber band track or of the band segments in the region of the ends. This can ensure that torque acting on the pin is preferably absorbed by the rubber bearing arrangement of the pin. This means that tensile and/or stretch loads in the region of the ends of the rubber band track or of the band segments can be avoided or at least reduced.

The rotational rigidity of the pins in relation to their respective tube preferably does not exceed the flexural strength of the rubber band track or of the band segments in the region of the ends. It is advantageous when the last circumstance applies at least in the application-specific pivoting angle region of the ends of the rubber band track or of the ends of the band segments in relation to each other. In other words, it is advantageous for the rotational rigidity of the pins in relation to their respective tube in the working region of the rubber band track to be always less than the flexural strength of the rubber band body in the region of the ends. This can ensure that when the ends of the rubber band track start to pivot towards each other, initially only the rubber mounting of the pins is exposed to torsion such that no forces or only a small amount of forces act on the structure in the region of the ends of the rubber band body.

According to a particularly preferred embodiment of the present invention, the rotational rigidity of the pins is at least a factor of between 1.5 and 4 times less than the flexural strength of the rubber band track or of the band segments in the region of the ends. Broadly speaking, the bending load on the ends of the rubber band body is all the smaller, the smaller the rotational rigidity of the pins in relation to the flexural strength of the rubber band track or of the band segments. Consequently, in certain circumstances it can be particularly advantageous for the rotational rigidity of the pins in relation to the flexural strength of the rubber band track or of the band segments to be negligibly small in the region of the ends.

The application-specific pivoting angle region of the ends of the rubber band track or of the band segments in relation to each other is normally between 0 and 30°. Therefore, the rubber mounting of the pins should therefore ensure sufficiently low rotational rigidity of the pins at least in this angular region. The increased susceptibility to torsional deformation of the rubber mounting even in a pivoting angle region of between 0 and 60° is preferably provided in order, for example, to keep the torsional load on the rubber band body low even when the track vehicle moves quicker. In a particularly preferred manner, the low rotational rigidity of the pins is provided in a pivoting angle region of between 0 and 80° in order to keep the bending and/or stretch loads on the ends of the rubber band body small even at extreme load peaks (e.g. when traveling over ridges or objects with a small radius of curvature).

The rotational rigidity of the pins in relation to their respective tube, brought about by the rubber mounting, is adjusted in dependence on the weight of the vehicle on which the rubber band track is to be fitted. The measurements of the rubber band body, as a rule, are all the greater, the higher the vehicle weight. Greater dimensioned rubber band bodies have an increased flexural strength. The torsional strength of the rubber band body is therefore dependent on the dimension of the track, which is derived from the vehicle weight. Therefore, the greater the dimensions of a rubber band track, the more the pin can also be mounted in its rubber mounting in a torsion-proof manner in order, nevertheless, still to ensure sufficiently high susceptibility to torsional deformation of the rubber mounting.

The rotational rigidity of the pins, brought about by the rubber mounting, when the pins are rotated by 15 degrees in relation to their respective tube at a vehicle weight of 4000 kg (that is to say 4 metric tons=4t), is preferably approximately 5 Nm. At a vehicle weight of 8000 kg, the rotational rigidity is preferably approximately 7 Nm. At a vehicle weight of 12000 kg the rotational rigidity is preferably approximately 12 Nm. At a vehicle weight of 15000 kg the rotational rigidity is preferably approximately 18 Nm. At a vehicle weight of 18000 kg the rotational rigidity is preferably approximately 23 Nm. At a vehicle weight of 20000 kg the rotational rigidity is preferably approximately 25 Nm. The last-mentioned values for the rotational rigidity of the pins, brought about by the rubber mounting, in relation to the vehicle weight provide an ideal compromise between susceptibility to torsional deformation of the pins that is as high as possible and in each case sufficient structural strength of the rubber mounting. The rotational rigidity/susceptibility to torsional deformation of the pins in relation to their respective tube corresponds to the torque that is required in order to achieve rotation of the pin out of the non-deformed position of the rubber mounting about a certain angle. Therefore, the rotational rigidity of the pins corresponds to the torque resistance with which the rubber mounting opposes a rotation of the pin about this angle.

The rotational rigidity of the pins in relation to their respective tube, brought about by the rubber mounting, is preferably adjusted via the tensile stress of the rubber compound. In this case, the tensile stress is preferably all the greater, the greater the vehicle weight. The greater the tensile stress of the rubber compound, the greater the rotational rigidity of the rubber mounting produced from this rubber compound, therefore the "harder" the rubber compound, the greater the torque resistance with which the rubber mounting opposes a rotation of the rubber-mounted pin. The tensile stress $\delta_i$ in terms of the present invention refers to the tensile stress to DIN 53504 which is defined as the quotient from the tensile force $F_i$ present when achieving a certain stretch at the rubber body and the initial cross section $A_0$ of the rubber body. Therefore, $\delta_i = F_i/A_0$ applies. In this case, the index reference i in the symbol $\delta_i$ stands for the numerical value of the associated stretch, e.g. $\delta_{300}$ for 300% stretch. The tensile stress $\delta_{300}$ of the rubber compound for the rubber mounting of the pins at vehicle weights of between 4000 kg and 20000 kg is approximately between 3.8 MPa and 12.4 MPa.

The rotational rigidity of the pins in relation to their respective tube, brought about by the rubber mounting, is preferably adjusted via the thickness of the rubber mounting between the pins and the inside surface of the tube. In this case, it is particularly advantageous when the thickness of the rubber mounting is provided by an approximately constant ratio between the diameter of the pin and the inside diameter of the tube. Broadly speaking, the diameter of the pin in the case of rubber band tracks is all the greater, the greater the weight of the vehicle on which the rubber band track is to be fitted.

According to a particularly preferred embodiment of the present invention, the rotational rigidity of the pins in relation to their respective tube, brought about by the rubber mounting, is adjusted via the force to be applied when pressing the pins into their respective tube and the compression of the rubber mounting connected to said pressing-in. Before pressing in the rubber-encased pins, they are preferably dipped in oil, for example rapeseed oil, and are then pressed into their respective tubes. On the one hand, the oil serves as a lubricant, on the other hand rubber surface of the rubber mounting is loosened by the oil, which subsequently, after the pressing-in operation, results in a fixed bond between the rubber surface of the rubber mounting and the inside surface of the tube.

The pressing-in force applied and the compression of the rubber mounting linked thereto are preferably all the greater, the greater the vehicle weight. It has proved particularly advantageous for the pressing-in force at vehicle weights of between 4000 kg and 20000 kg to be approximately between 35 kN and 80 kN.

The invention also relates to a rubber band track having two ends which are connectable together to form a closed track by means of one of the above-described devices as claimed in the invention. A tube having a pin which is rubber-mounted in the tube is inserted in each end of the rubber band track. The pins are couplable to each other in a rotationally fixed manner by means of at least one connector. This rotational rigidity can be produced, for example, by means of an interlocking fit between connector and pin. To this end, for example, the pin ends can be milled in a tangential manner and inserted into corresponding fits in the connector. In particular, in order to prevent the connector slipping off the pin ends, the frame of the connector can be clamped fixedly to the pin ends by means of a screw (force locking connection). The rotational rigidity of the pins in relation to their respective tube, brought about by the rubber mounting, is adjusted in the case of the rubber band track as claimed in the invention in dependence on the flexural strength of the rubber band track in the region of the ends.

In addition, the present invention also comprises a rubber band track having several band segments, the ends of which are connectable to each other to form a closed track by means of one or several above-described devices as claimed in the invention. In this case, in each case a tube having a pin which is rubber-mounted in the tube is inserted in each of the ends. The pins of two band segments to be connected together are couplable to each other in a rotationally fixed manner by means of at least one connector. The rotational rigidity of the pins in relation to their respective tube, brought about by the rubber mounting, is adjusted in dependence on the flexural strength of the band segments in the region of the ends.

The band segments each preferably have a base body made of rubber, which has inserts which have been vulcanized-in, can be loaded in a tensile manner and wrap around the tubes inserted in a transverse manner in the base body.

Further advantageous embodiments and improvements of the invention are produced from the following description of preferred realization examples of the invention. It is pointed out that the invention also comprises further embodiments which are produced by a combination of features which are detailed separately in the patent claims and/or in the description and the figures.

Other features which are considered as characteristic for the invention are set forth in the appended claims.

Although the invention is illustrated and described herein as embodied in a connecting device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, where identical or similar references in the drawings designate identical or similar parts.

DETAILED DESCRIPTION OF THE INVENTION

Figure 4A:
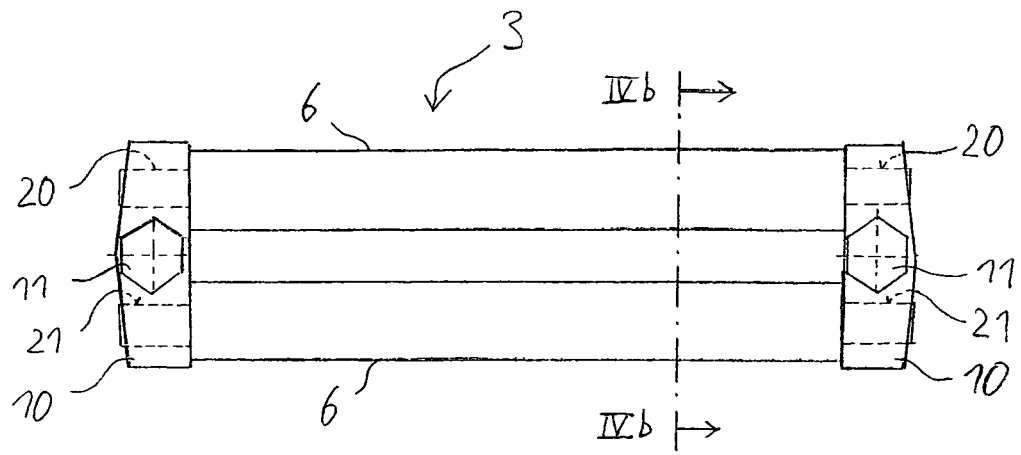
FIG. 4A shows a top view of a preferred embodiment of the device according to the invention.
Figure 4B:
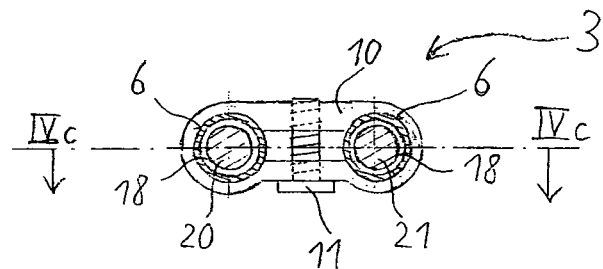
FIG. 4B shows a sectional view of the preferred embodiment of the device according to the invention, taken along the section line marked in FIG. 4A.
Figure 4C:
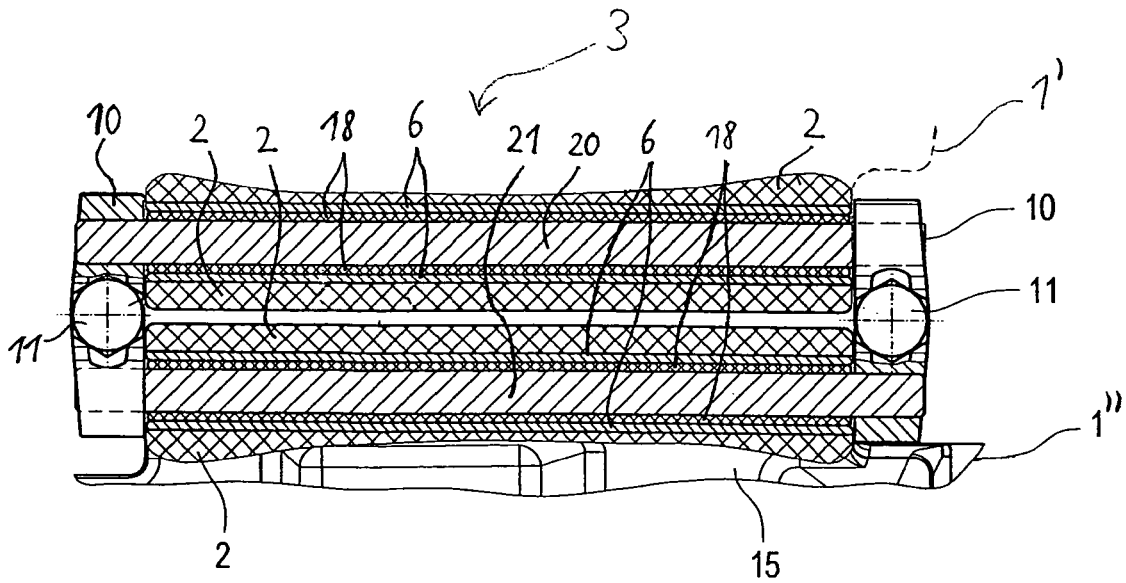
FIG. 4C shows a sectional view of the preferred embodiment of the device according to the invention, taken along the section line marked in FIG. 4B.

Referring now once more to the figures of the drawing in detail, FIGS. 4A, 4B and 4C show different views of a preferred embodiment of the device 3 according to the invention for connecting one end 101 of a rubber band track 1 to another end 102 of the rubber band track or for connecting one end 101' of a first band segment 1' of a rubber band track to another end 102' of a second band segment 1" of a rubber band track.

The device 3 comprises two tubes 6. A pin 20, 21 is situated in each of the tubes 6. The pins 20, 21 are rubber-mounted in their respective tube 6. The rubber mounting 18 is situated between the surface of the pin and the inside wall of the tube. The rubber mounting 18 contacts both the surface of the pin and the inside wall of the tube in a force-fitting or frictionally engaged manner. A rotating of the pins 20, 21 in their respective tube 6 therefore brings about deformation or twisting of the rubber mounting 18 without the contact faces between the pins 20, 21 and the rubber mounting 18, on the one hand, and between the inside wall of the tube and the rubber mounting 18, on the other hand, being displaced mutually towards each other. The rubber mounting 18 preferably has a hollow cylindrical shape. The rubber mounting 18, in this case, can consist of a single hollow cylinder per tube 6. However, it is just as possible for the rubber mounting 18 to consist of two or more hollow cylindrical parts. There can be identical or different spacings between said hollow cylindrical parts. A multi-part rubber mounting 18 is advantageous as a pin 20, 21 with such a multi-part rubber mounting 18 is easier to press into the respective tube 6, i.e. using less force. The individual hollow cylinder parts of the rubber mounting 18 are preferably spaced apart by a few millimeters, e.g. between 1 and 10 mm, preferably between 1 and 5 mm. It is recommended, however, that the so-called fill level of the bearing, that is to say the proportion of rubber-filled space between the pin and the inside wall of the tube, is at least 95%, preferably at least 98% of the overall space. This ensures a reliable interference fit of the rubber mounting 18 between the inside wall of the tube and the rubber mounting 18, on the one hand, and between the outside surface of the pin and the rubber mounting 18, on the other hand.

Each of the pipes 6 can be inserted in each case into the one end 101, 101' and into the other end 102, 102' of the rubber band track 1 or of the band segments 1', 1". This can be seen in particular from the sectional view in FIG. 4C where the tube 6 is inserted into the rubber base body 2, 15 of the ends of the band segments 1' and 1". The tubes 6 are preferably inserted into the rubber base body 2 in such a manner that there is no displacement between the outside surface of the tube and the face of the rubber base body abutting thereto. The pins 20, 21 preferably protrude a little out of the tubes 6 in each case at both ends. The pins 20, 21 are couplable to each other in a rotationally fixed manner via said protruding ends of the pins 20, 21 by means of connectors 10. To this end, the connectors 10 preferably have a frame-like structure which can be displaced over the two pins 20, 21. The frame-like structure of the connectors can preferably be clamped by means of a screw 11 such that the connector 10 is connected to the pins 20, 21 in a force locking manner, thereby preventing the connector 10 from slipping off the pins 20, 21. Over and above this, once the connector 10 has been placed in position, connector securing means can also be mounted on the pins 20, 21. Such a connector securing means, for example, can be a split-pin, which is pushed through the pin outside the connector 10 through a bore in the end of the pin 20, 21 protruding beyond the connector 10.

As claimed in the invention, the rotational rigidity of the pins 20, 21 in relation to their respective tube 6, brought about by the rubber mounting 18, is adjusted in dependence on the flexural strength of the rubber band track 1 or of the band segments 1', 1" in the region of the ends 101, 102' 101', 102'. In order to achieve this, it can be expedient with reference to FIG. 4c for the rubber compound of the rubber mounting 18 to differ from the rubber compound of the rubber base body 2. This is advantageous because the specifications of the rubber compound of the rubber mounting 18 can then be adapted especially to the requirements depicted above. However, this is not urgently necessary for it can also be advantageous, under certain circumstances, to use the identical rubber compound in each case for rubber mounting 18 and rubber base body 2.

Figure 1A:
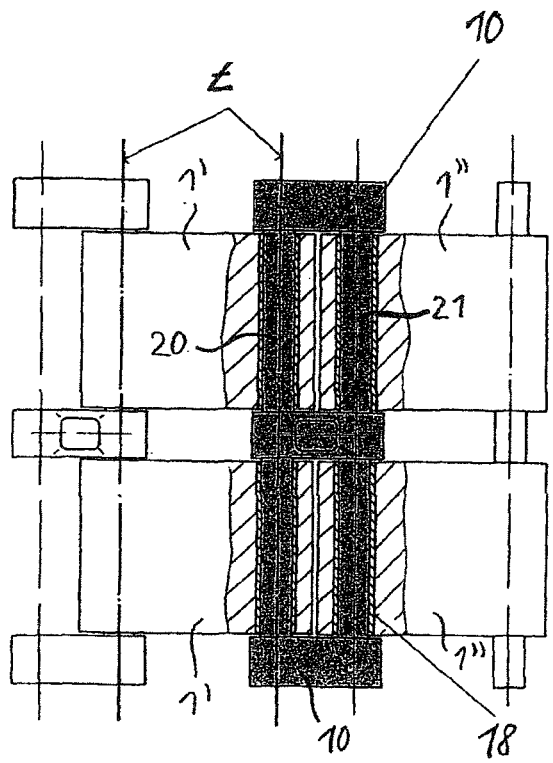
FIGS. 1A and 1B show a schematic representation of a steel link vehicle track in accordance with the connector principle.
Figure 1B:
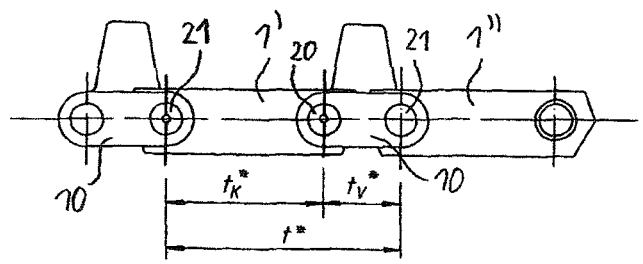
Figure 2:
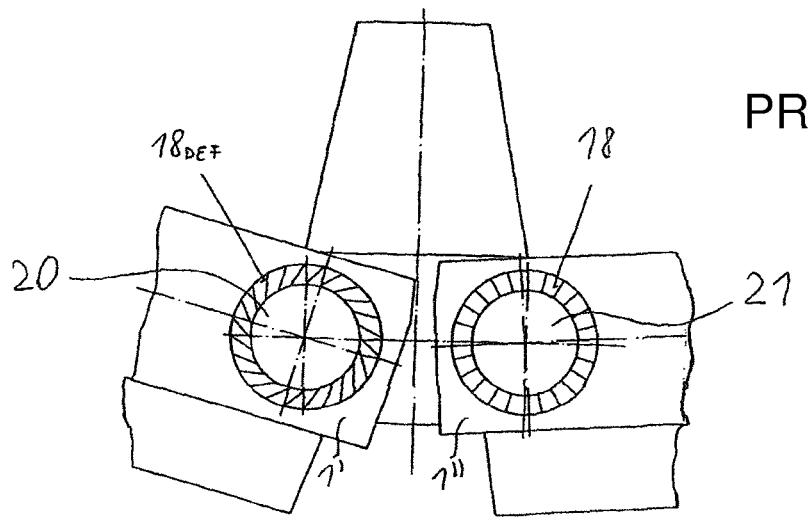
FIG. 2 shows an illustration of the method of operation of the rubber-mounted pins in a steel vehicle track in accordance with the connector principle.
Figure 3:
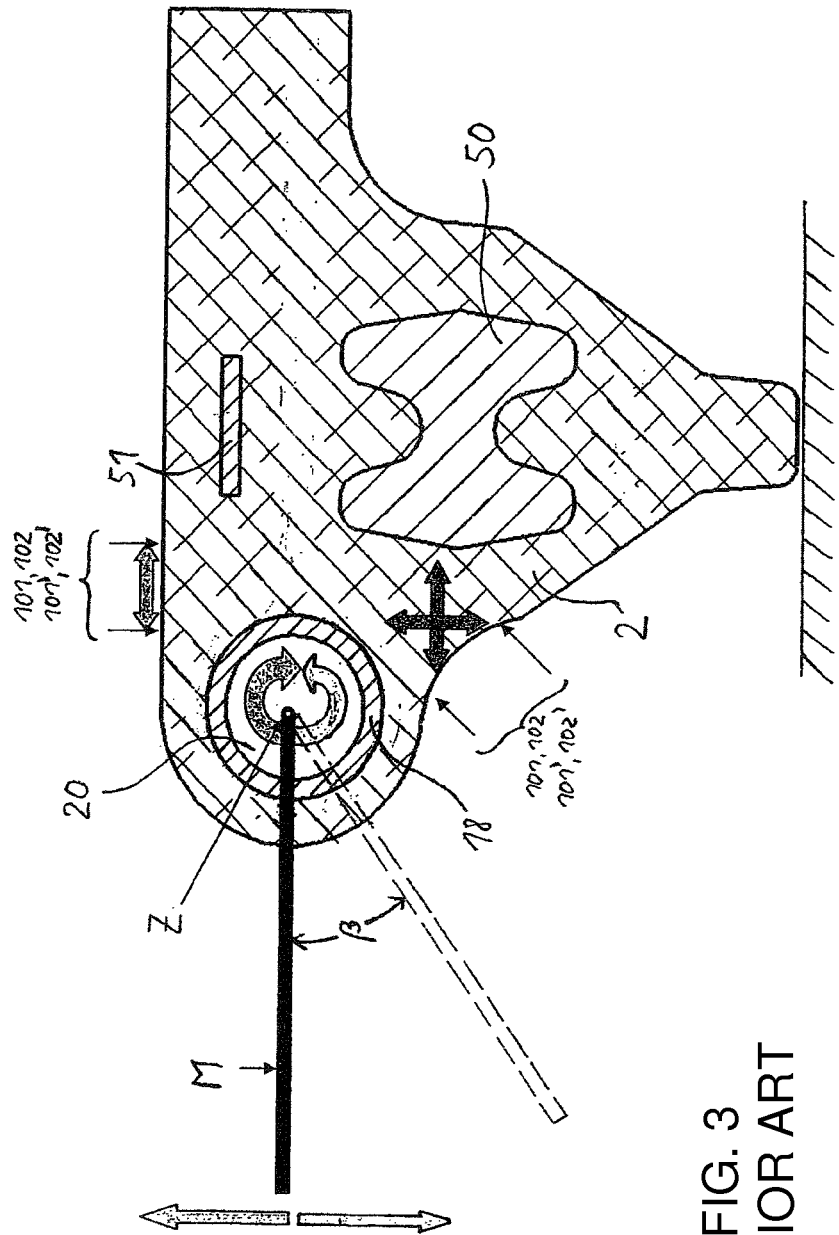
FIG. 3 shows a representation to explain the risk of tearing and kinking in the end region of a rubber band track in accordance with the connector principle.

At least in the application-specific pivoting angle region a (see FIG. 8 and FIG. 9 also in this respect) of the ends 101, 102 of the rubber band track or of the ends 101', 102' of the band segments 1', 1" in relation to each other, the rotational rigidity of the pins 20, 21 in relation to their respective tube 6 is preferably not greater than the flexural strength of the rubber band track 1 or of the band segments 1', 1" in the region of the ends 101, 102; 101', 102'. The rotational rigidity of the pins 20, 21 in relation to their respective tube 6 corresponds to the torque that is required in order to achieve rotation of the pin 20, 21 out of the non-deformed position of the rubber mounting 18 about an angle β (see FIG. 3 also in this respect). The rotational rigidity of the pins 20, 21 therefore corresponds to the torque resistance with which the rubber mounting 18 opposes a rotation of the pin 20, 21 about the angle β. The torque resistance with which the end region 101, 102; 101', 102' opposes a kink in relation to the remaining part of the rubber base body 2 about the angle β can be understood in an analogous manner as the flexural strength of the rubber band track 1 or of the band segments 1', 1" in the region of the ends 101, 102; 101', 102'. In order to measure the flexural strength of the rubber band track 1 or of the band segments 1', 1" in the region of the ends 101, 102; 101', 102', it is possible, for example in the case of FIG. 3, to determine the angle at which the neutral fiber of the rubber base body 2 kinks (this neutral fiber extends approximately in the middle between the cross members 50 and 51) when a certain torque acts directly on the end region of the rubber band track or of the band segments.

The rotational rigidity of the pins 20, 21 is preferably less, at least by a factor of 1.5 to 4, than the flexural strength of the rubber band track 1 or of the band segments 1', 1" in the region of the ends 101, 102; 101', 102'. In a particularly preferred manner, the rotational rigidity of the pins 20, 21 in relation to the flexural strength of the rubber band track 1 of the band segments 1', 1" is negligibly small in the region of the ends 101, 102; 101', 102'.

Figure 5:
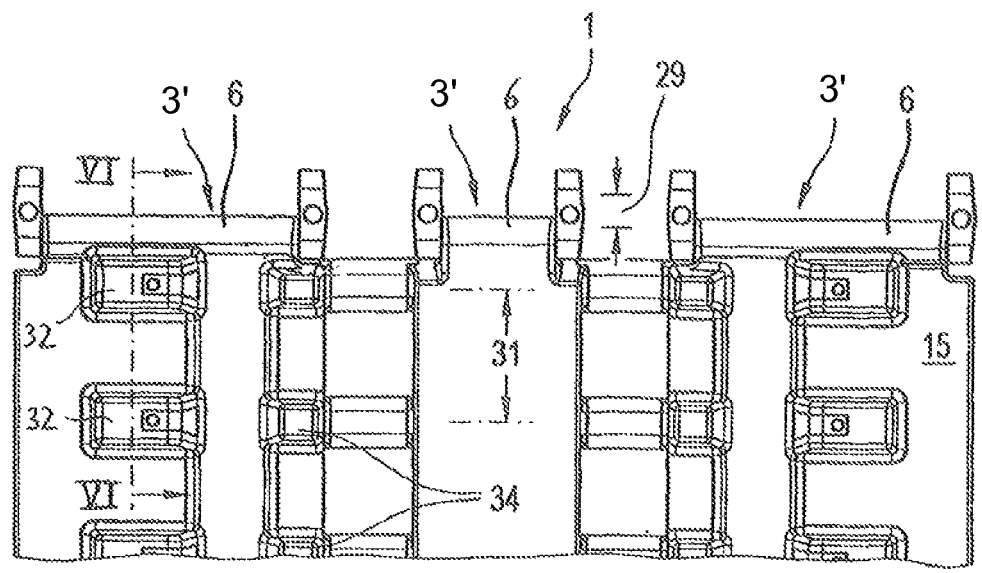
FIG. 5 shows an arrangement of several devices according to the invention within the framework of the concept of a caterpillar band track.
Figure 6:
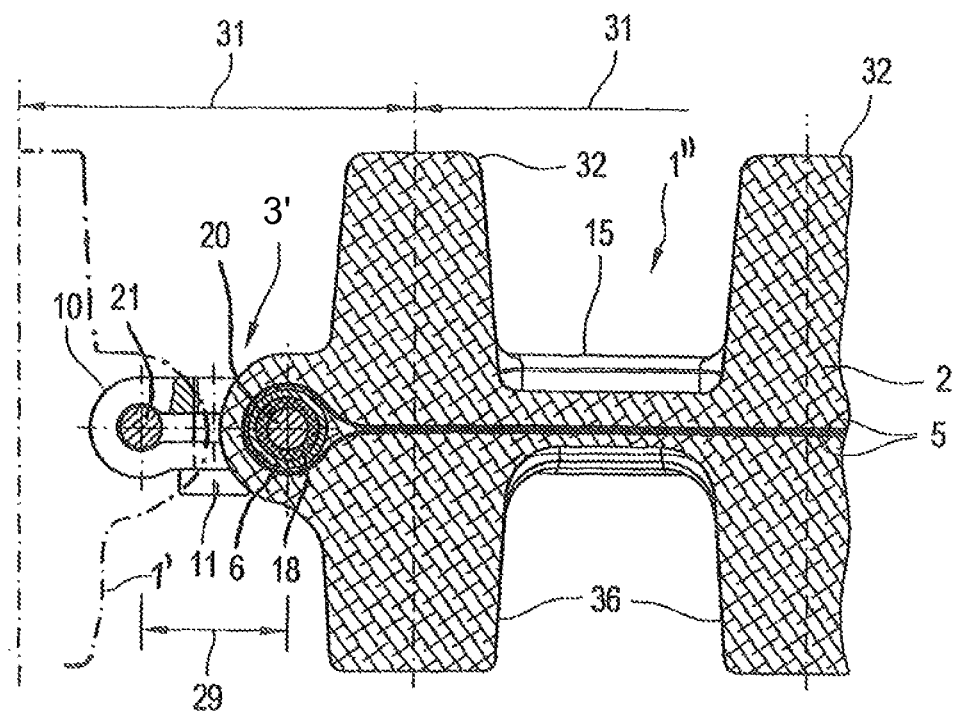
FIG. 6 is a sectional view taken along the section line VI-VI in FIG. 5.

FIGS. 5 and 6 show the use of the device 3 according to the invention with a caterpillar track. The closing point 3', which is defined by the pins 20, 21 and the connector 10, has a pitch 29. This is preferably a third of the band segment pitch 31, which is defined by the distance between the guide teeth 32 and between the drive cams 34 which are in alignment with the guide teeth 32. The caterpillar band track has running cams 36 vulcanized-in on the bottom side. In the case of the caterpillar band track shown in FIGS. 5 and 6, three closing point 3' are arranged at a level next to each other. However, it is also just as possible to provide only one single closing point 3' over the entire width of the track instead of this. The band segments 1', 1" of the caterpillar band track can have inserts 5, which have been vulcanized-in in their base body 2, can be loaded in a tensile manner and wrap around the tubes 6 inserted in a transverse manner in the base body 2.

The connector 10 provides for simple mountability of the track on the vehicle and simple demountability of the track from the vehicle. It is not necessary to raise the vehicle. The caterpillar band track is laid out on the ground and, once the vehicle has been driven onto the laid-out line of track, is connected at the closing point or points 3. The removal of the divisible track is carried out in the reverse order. One advantage is that expenditure of time and money when mounting the track on the vehicle and removing said track from the vehicle is very small and requires little labor. The risk of accident when mounting the band track on the vehicle is reduced as the vehicle does not have to be raised. Finally, the space required for storage and transport is small as it is possible to roll up the band track with closing point or closing points. In the case of band tracks with several closing points, individual band segments can be replaced directly on the vehicle in the event of damage.

Figure 7:
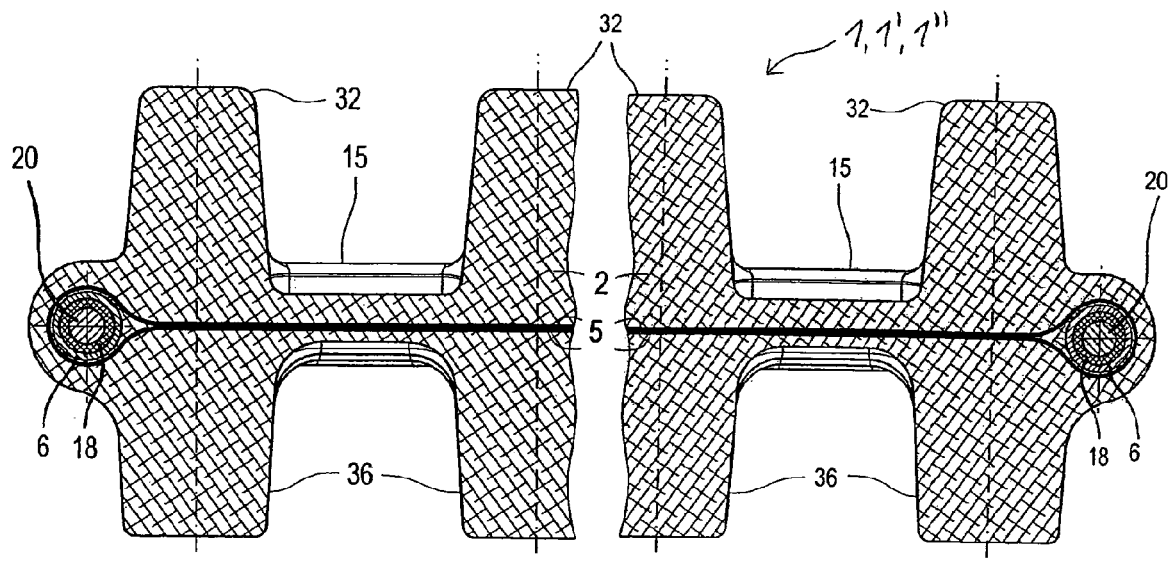
FIG. 7 shows a preferred embodiment of a band segment of a rubber band track according to the invention.

FIG. 7 shows a band segment 1', 1" or a band track 1 with a closing point as claimed in the invention. Neither the presence of running cams 36 nor the provision of guide teeth 32 and drive cams 34 is necessary for the functioning of the device 3 as claimed in the invention.

Figure 8:
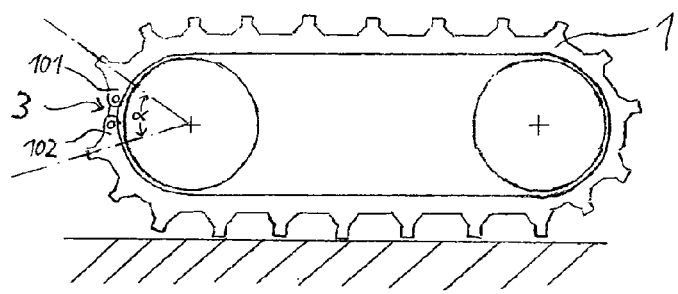
FIG. 8 shows a schematic representation of a rubber band track according to the invention having two ends.

FIG. 8 consequently shows, as an example, a rubber band track 1, without guide teeth and drive cams, having two ends 101, 102 which are connectable to each other to form a closed track by means of one single device 3 as claimed in the invention. In this case, in the event of a wide rubber band track 1, the single device 3, in an analogous manner to FIG. 5, can also be replaced by several closing points 3 which are in alignment with each other. FIG. 8 also illustrates the concept of the application-specific pivoting angle region a introduced above. The ends 101, 102 of the rubber band track 1 are pivoted towards each other by the angle α at the guide rollers and/or drive rollers of the crawler vehicle. As each of the two rubber mountings 18 about the pins 20, 21 absorbs in each case approximately half of the pivoting a of the ends towards each other, α=2β is roughly true.

Figure 9:
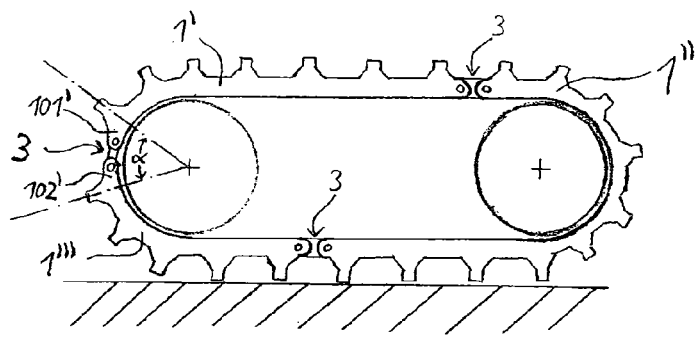
FIG. 9 shows a schematic representation of a rubber band track according to the invention having several band segments.

FIG. 9 shows a rubber band track as claimed in the invention having several band segments 1', 1", 1''', the ends of which 101', 102' are connectable to each other to form a closed track by means of one or several devices 3 as claimed in the invention. In order to avoid repetitions, the embodiments in respect of FIG. 8 are referred to in a fully extensive manner, the same also being applicable in an analogous manner to the embodiment in FIG. 9.

Figure 10:
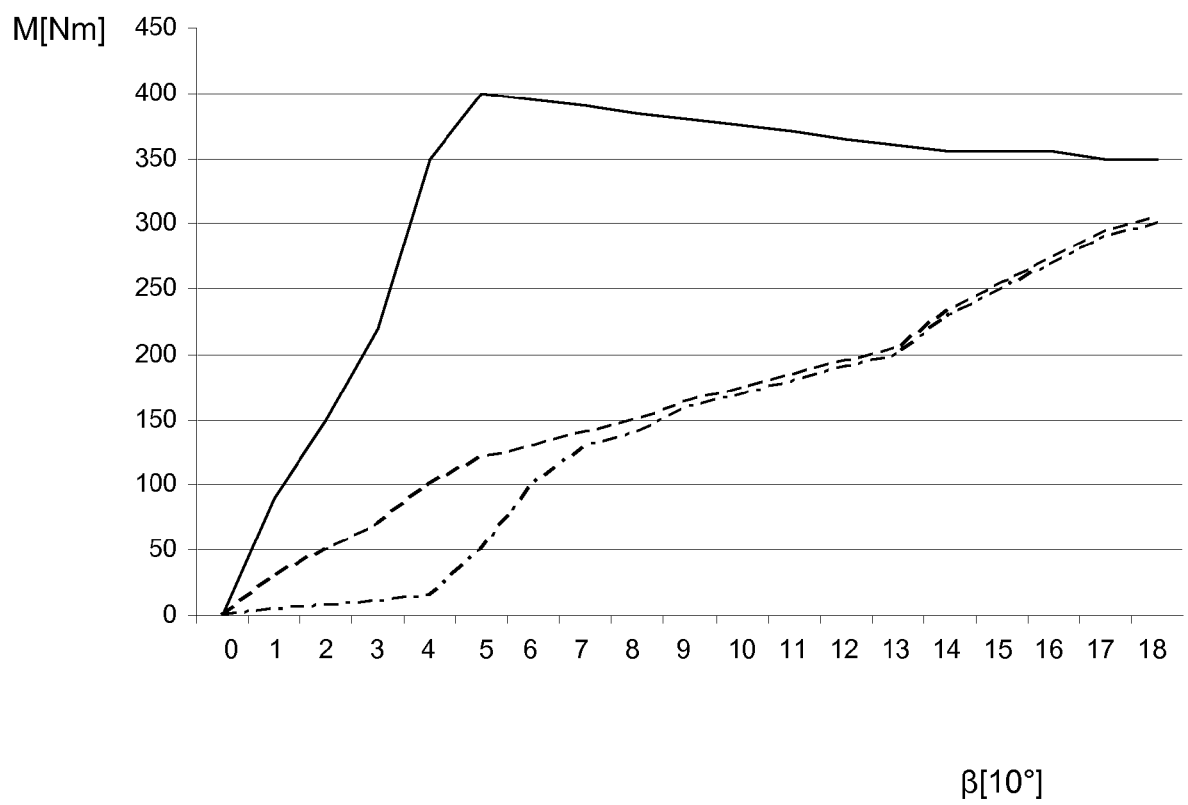
FIG. 10 shows a diagram to represent the angular dependence of the torque which is required in order to achieve rotation of a rubber-mounted pin, on the one hand for a moving track with steel links, on the other for a band track with non-adapted pin bearings and finally for a rubber band track with a pin mounting according to the invention.

FIG. 10 shows a diagram in which the dependency of the rotational rigidity of the pin 20, 21 on the respective angle of rotation β is represented for three different types of bearing. The x-axis is marked off in steps of 10°, therefore extends from 0 to 180°. The rotational rigidity, that is to say the torque resistance, with which the corresponding bearing opposes a rotation of the pin, is specified in Nm (Newton meters).

The continuous line shows the ratios with a conventionally rubber-mounted pin in the case of a caterpillar track with steel links. The curve climbing steeply right from the start makes clear that the rubber mounting opposes the pin rotation right from the start with a high, constantly increasing torque resistance. The torque resistance increases already in the first 50° to the very high value of 400 Nm. Even at this angular value of 50° the bearing is already not able to absorb any more torque resistance such that in the event of potential further rotation, the forces have to be absorbed by the steel links of the track. However, with the toughness and structural strength of steel this does not, as a rule, present a problem for such a track.

The broken line shows the ratios in the case of a rubber band track with conventional rubber mounting. The characteristic of this broken-line curve is similar to the continuous-line curve of the steel track, only with the difference that the gradient of the broken-line curve of the rubber band track does not climb as steeply. This is because when the ends of the rubber band track are pivoted towards each other, the torque is absorbed not only by the rubber bearing but also by the ends of the rubber band body themselves. However, the problem with the conventional rubber mounting is that as early as at the first degree of the rotation of the pin 20, 21 in relation to its mounting, as the rotation increases a constantly growing bending torque is transferred onto the rubber band body arranged around the rubber mounting. This leads to fatigue in the rubber material of the rubber band body in the connection region of the two ends, which can ultimately result in destructive tearing in the rubber band body and, in the worst case, in the destruction of the rubber band track.

The dash-dot line shows the ratios in the case of a rubber band track with rubber mounting 18 as claimed in the invention. Here it can clearly be seen that the rubber mounting 18 opposes rotation of the pin 20, 21 as far as up to an angle of ca. 40° with almost no torque resistance. This ensures that in the first 40° of the rotational region of the pin almost all torques and forces are absorbed only by the bearing and do not load the surrounding rubber band body. Only when, from a rotation of the pin about approximately 40°, the rubber mounting 18 can no longer absorb any additional forces, the torque resistance increases and the track body has to absorb the additional forces. Only then would the rubber band body start to rotate. As, however, the angular region of rotation for β from 0 to 40° (=application-specific pivoting angle region α from 0 to 80°) covers the operation of a rubber band track even at extreme load peaks, this increase in the torque resistance no longer has any effect.

Therefore the device 3 as claimed in the invention ensures a wear-free connection between two ends of a rubber band track or of two band segments, both as concerns the friction-free mounting of the pins 20, 21 per se and the reduced tensile and/or stretch load of the end regions of the rubber band body.

The invention claimed is:

1. A device for connecting first and second free ends of a rubber link track to one another or for connecting first and second free ends of first and second band segments, respectively, of a rubber band track to one another, the device comprising:
    at least two tubes each having a pin mounted therein with a rubber mounting, wherein one of said tubes is to be inserted into the first end of the rubber band track or of a band segment and another one of said tubes is to be inserted into the second end of the rubber band track or of a band segment; and
    at least one connector configured to couple said pins together in a rotationally fixed manner;
    wherein a rotational rigidity of said pins relative to a respectively associated said tube, brought about by the rubber mounting, is adjusted via a thickness of the rubber mounting between said pins and an inside surface of said tube or via a force to be applied when pressing said pins into the respective said tube and a compression of the rubber mounting in connection with the pressing-in process.

2. The device according to claim 1, wherein a value of the rotational rigidity of said pins in relation to the respective said tube, at least in an application-specific pivoting angle region of the ends of the rubber band track or of the ends of the band segments in relation to each other, does not exceed a value of a flexural strength of the rubber band track or of the band segments in the region of the ends.

3. The device according to claim 2, wherein the value of the rotational rigidity of said pins is less than the flexural strength of the rubber band track or of the band segments in the region of the ends at least by a factor of between 1.5 and 4 times.

4. The device according to claim 2, wherein the value of the rotational rigidity of said pins in relation to the flexural strength of the rubber band track or of the band segments is negligibly small in a region of the ends.

5. The device according to claim 2, wherein the application-specific pivoting angle region of the ends of the rubber band track or of the band segments in relation to each other is between 0 and 30 degrees.

6. The device according to claim 2, wherein the application-specific pivoting angle region of the ends of the rubber band track or of the band segments in relation to each other is between 0 and 60 degrees.

7. The device according to claim 2, wherein the application-specific pivoting angle region of the ends of the rubber band track or of the band segments in relation to each other is between 0 and 80 degrees.

8. The device according to claim 1, wherein the rotational rigidity of the pins in relation to their respective tube, brought about by the rubber mounting, is adjusted in dependence on the weight of the vehicle on which the rubber band track is to be fitted.

9. The device as claimed in claim 8, wherein the rotational rigidity of said pins, brought about by the rubber mounting, when the pins are rotated by 15 degrees in relation to the respective said tube has a value of:
approximately 5 Nm at a vehicle weight of 4000 kg;
approximately 7 Nm at a vehicle weight of 8000 kg;
approximately 12 Nm at a vehicle weight of 12000 kg;
approximately 18 Nm at a vehicle weight of 15000 kg;
approximately 23 Nm at a vehicle weight of 18000 kg; and
approximately 25 Nm at a vehicle weight of 20000 kg.

10. The device according to claim 8, wherein the rotational rigidity of said pins in relation to the respective said tube, brought about by the rubber mounting, is adjusted via a tensile stress of the rubber compound, and the tensile stress is greater with a greater vehicle weight.

11. The device according to claim 10, wherein the tensile stress$_{300}$ to DIN 53504 of the rubber compound at vehicle weights of between 4000 kg and 20000 kg is approximately between 3.8 MPa and 12.4 MPa.

12. The device according to claim 1, wherein the thickness of the rubber mounting is provided by an approximately constant ratio between a diameter of said pin and the inside diameter of the tube, the diameter of said pin being all the bigger, the greater the vehicle weight.

13. The device according to claim 1, wherein the pressing-in force applied and the compression of the rubber mounting connected thereto is all the greater, the greater the vehicle weight.

14. The device as claimed in claim 13, wherein a value of the pressing-in force at a vehicle weight in a range between 4000 kg and 20000 kg lies between approximately 35 kN and approximately 80 kN.

15. A rubber track, comprising:
first and second ends, and a singe connector device according to claim 1 connecting said first and second ends to form a closed track;
a tube having a pin rubber-mounted therein being inserted in each of said first and second ends;
said pins being coupled to one another in a rotationally fixed manner by way of at least one connector; and
wherein a rotational rigidity of said pins in relation to the respective said tube, brought about by a rubber mounting, is adjusted in dependence on a flexural strength of the rubber track in a region of said ends.

16. The rubber band track, comprising:
a plurality of band segments with ends connected to each other by one or more connector devices according to claim 1 to form a closed track;
wherein in each case a tube having a pin which is rubber-mounted in said tube is inserted in each of the ends of the band segments;
wherein said pins of two said band segments are connected to each other in a rotationally fixed manner by way of at least one connector; and
wherein the rotational rigidity of the pins in relation to a respective said tube, brought about by the rubber mounting, is adjusted in dependence on a flexural strength of the band segments in the region of the ends.

17. The rubber band track according to claim 16, wherein said band segments each have a base body made of rubber, and said base body has tensile-resisting inserts vulcanized into the rubber and configured to wrap around said tubes that are transversely inserted in said base body.

* * * * *